US008818592B2

(12) United States Patent
Dessirier et al.

(10) Patent No.: US 8,818,592 B2
(45) Date of Patent: *Aug. 26, 2014

(54) METHOD OF CONTROLLING AN ENERGY STORAGE UNIT IN A VEHICLE MICRO-HYBRID SYSTEM

(75) Inventors: Bruno Dessirier, St. Germain en Laye (FR); Marc Ranier, Villeneuve le Roi (FR); Serge Newiadomy, Clichy Sous Bois (FR); Benoit Soucaze-Guillous, Bondy (FR); Philippe Masson, Yerres (FR); Pierre Sardat, Le Raincy (FR); Michaël Chemin, Festigny (FR); Jean-Claude Matt, Dijon (FR)

(73) Assignee: Valeo Equipements Electriques Moteur, Creteil Cedex (FR)

( * ) Notice: Subject to any disclaimer, the term of this patent is extended or adjusted under 35 U.S.C. 154(b) by 478 days.

This patent is subject to a terminal disclaimer.

(21) Appl. No.: 13/143,896

(22) PCT Filed: Jan. 7, 2010

(86) PCT No.: PCT/FR2010/050017
§ 371 (c)(1),
(2), (4) Date: Nov. 18, 2011

(87) PCT Pub. No.: WO2010/079302
PCT Pub. Date: Jul. 15, 2010

(65) Prior Publication Data
US 2012/0095644 A1  Apr. 19, 2012

(30) Foreign Application Priority Data
Jan. 12, 2009  (FR) ...................... 09 50115

(51) Int. Cl.
*B60W 20/00*  (2006.01)

(52) U.S. Cl.
USPC ............................... 701/22; 903/903; 701/99

(58) Field of Classification Search
USPC .................... 701/22, 36, 99, 29.1; 340/636.1, 340/636.11, 636.12, 636.15, 636.16, 340/636.18, 636.19; 180/65.29; 320/152, 320/153, 167
See application file for complete search history.

(56) References Cited

U.S. PATENT DOCUMENTS

| | | | | |
|---|---|---|---|---|
| 6,316,917 | B1 * | 11/2001 | Ohta | 320/166 |
| 6,788,027 | B2 * | 9/2004 | Malik | 320/134 |
| 6,870,336 | B2 * | 3/2005 | Murakami et al. | 318/432 |
| 2003/0169001 | A1 * | 9/2003 | Murakami et al. | 318/139 |

(Continued)

FOREIGN PATENT DOCUMENTS

| | | |
|---|---|---|
| DE | 10 2006 044892 | 4/2008 |
| FR | 2 918 027 | 1/2009 |

*Primary Examiner* — Jason Holloway
(74) *Attorney, Agent, or Firm* — Berenato & White, LLC

(57) ABSTRACT

A method of controlling a supercapacitor energy storage unit (12), included in a motor vehicle micro-hybrid system, is disclosed. The storage unit is suitable for performing the functions of an alternator, starter and automatic stop-restart of the vehicle heat engine, regenerative braking and torque assistance. The energy storage unit (12) is a plurality of supercapacitor elementary cells connected in series (C1 to C10) and capable of delivering information (Vmax, Temp and DeltaV) on its internal status. The method includes various stages of: comparing a temperature (Temp) with at least one temperature threshold (ST1=55° C., ST2=65° C. and ST3=70° C.); and, deciding on limitations of the availability of functions of the unit when the (Temp) information reaches the temperature threshold (ST1=55° C., ST2=65° C. and ST3=70° C.).

11 Claims, 4 Drawing Sheets

(56) References Cited

U.S. PATENT DOCUMENTS

| | | | |
|---|---|---|---|
| 2004/0140904 A1* | 7/2004 | Bertness | 340/636.15 |
| 2005/0093303 A1* | 5/2005 | Turner | 290/40 A |
| 2008/0211457 A1 | 9/2008 | Rudorff et al. | |
| 2010/0070123 A1* | 3/2010 | Itoh et al. | 701/22 |
| 2010/0258369 A1* | 10/2010 | Ranier et al. | 180/65.29 |

\* cited by examiner

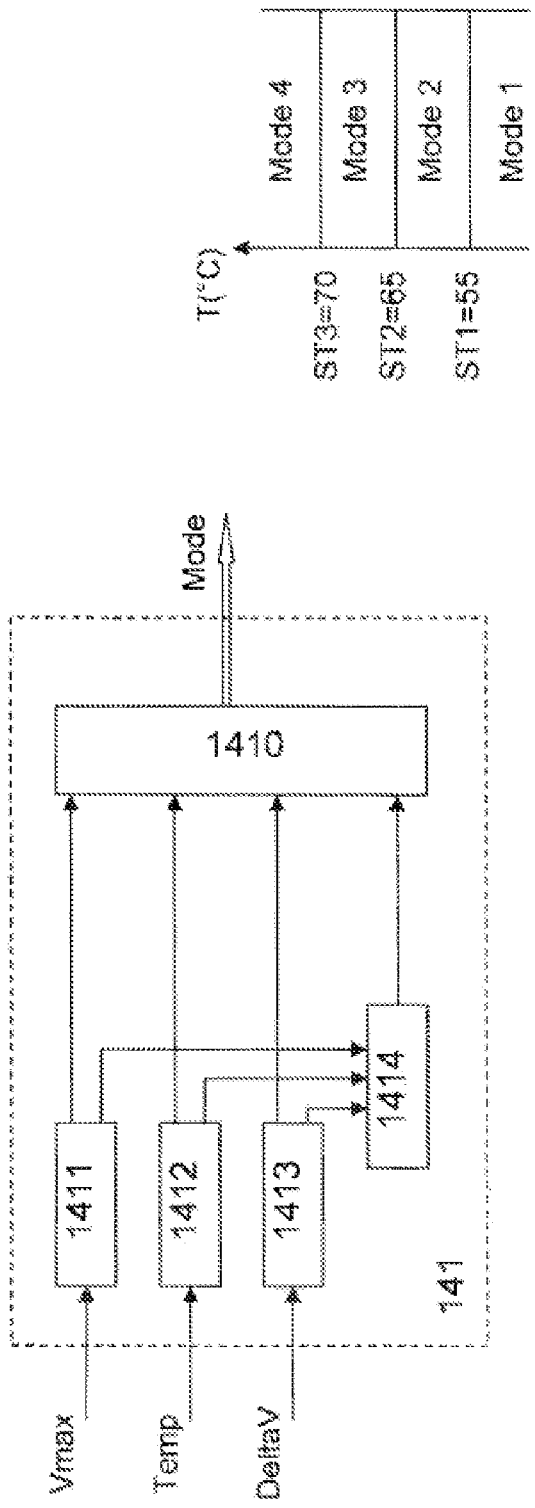

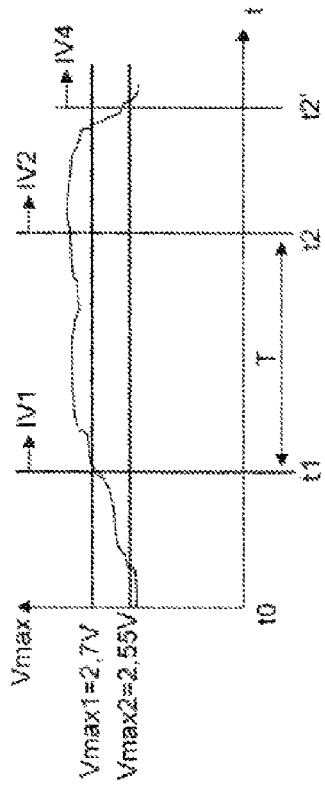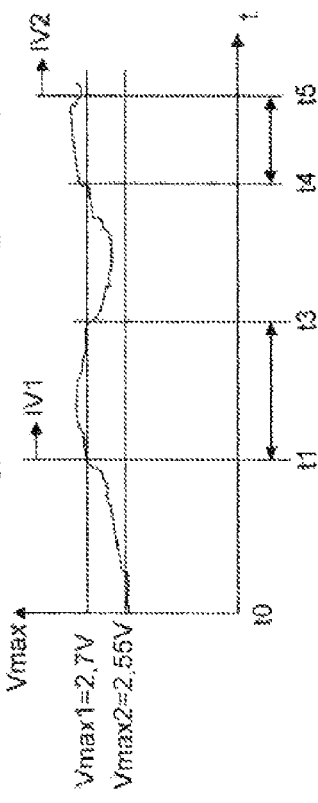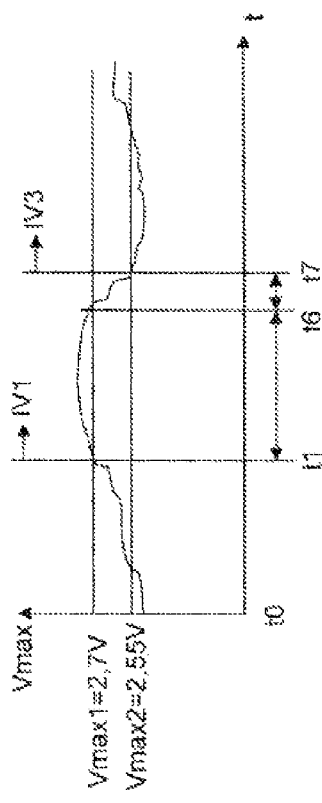

METHOD OF CONTROLLING AN ENERGY STORAGE UNIT IN A VEHICLE MICRO-HYBRID SYSTEM

CROSS-REFERENCE TO RELATED APPLICATIONS AND CLAIM TO PRIORITY

This application relates to International Application No. PCT/FR2010/050017 filed Jan. 7, 2010 and French Patent Application No. 09/50115 filed Jan. 12, 2009, of which the disclosures are incorporated herein by reference and to which priority is claimed.

FIELD OF THE INVENTION

This invention is generally applicable in the motor vehicle field. More particularly, the invention relates to a method of controlling a supercapacitor energy storage unit in a vehicle micro-hybrid system suitable for performing the functions of an alternator, starter and automatic stop-restart of the vehicle heat engine, regenerative braking and torque assistance, the energy storage unit comprising a plurality of supercapacitor elementary cells connected in series.

The invention also relates to a micro-hybrid system designed for using the method.

BACKGROUND OF THE INVENTION

To reduce the fuel consumption of motor vehicles and therefore the pollution they generate, the practice is known of equipping a vehicle with a micro-hybrid system, for example one with an alternator-starter, by means of which a regenerative braking mode is possible.

Also known from the inventive entity is a micro-hybrid system of the above type comprising an electrical rotating machine, a reversible alternating current-direct current converter, a supercapacitor energy storage unit and a reversible direct current-direct current voltage converter.

The supercapacitor energy storage unit is formed from a plurality of very large capacity capacitors called "supercapacitor", "ultra-capacity" or "UCAP" by a person skilled in the art.

The electrical energy recovered by means of the electrical rotating machine is stored in the supercapacitors and is then restored for various different uses, particularly for supplying consuming devices with a floating DC voltage greater than the battery voltage.

In the light of the rated values of voltage available at present for supercapacitors, it is a known practice to assemble them in series so as to form a supercapacitor energy storage unit suitable for supporting the voltage values usually present in a regenerative braking micro-hybrid system as indicated above.

In this system, the disparities existing in the rated values of voltage and of capacity of the supercapacitors have led the designers to provide for electronic balancing circuits.

Essentially, the function of these electronic balancing circuits is to protect the supercapacitors from excessively high charging voltages capable of causing voltage breakdowns or premature ageing of the capacitive unit. Furthermore, a certain uniformity of the charging voltages of the various different supercapacitors, assisting use of the capacitive unit, is obtained due to these balancing circuits. With the introduction of balancing circuits, a technical advance has been possible in terms of reliability and life of the packs of supercapacitors.

SUMMARY OF THE INVENTION

The applicant, in its French patent application No. 0756124000 filed on 28 Jun. 2007 and entitled "Method for controlling a vehicle micro-hybrid system and energy storage unit and micro-hybrid system for using the latter", defined a set of information representative of the status of an electrical energy storage unit included in a regenerative braking micro-hybrid system.

It is proposed that the invention make use of the available information, representative of the status of the energy storage unit, to improve control of the energy storage unit.

From a first aspect, the invention relates to a method of controlling a supercapacitor energy storage unit included in a motor vehicle micro-hybrid system suitable for performing the functions of an alternator, starter and automatic stop-restart of the vehicle heat engine, regenerative braking and torque assistance, the energy storage unit comprising a plurality of supercapacitor elementary cells connected in series and delivering information on its internal status.

In accordance with the invention, the method comprises the stages of comparing temperature information, as information delivered by the energy storage unit, with at least one temperature threshold and of deciding on a limitation of the availability of the functions when the temperature information reaches the at least one temperature threshold mentioned above.

According to a particular feature, this limitation of the availability of the functions comprises a prohibition of the regenerative braking function and/or of the torque assistance function when the temperature information reaches a first temperature threshold.

According to another particular feature, this limitation of the availability of the functions also comprises a prohibition of the automatic stop-restart function when the temperature information reaches a second temperature threshold higher than the first temperature threshold. Preferably, this limitation of the availability of the functions also comprises regulation at a predetermined fixed value of a voltage supplied by the alternator function.

According to another particular feature, this limitation of the availability of the functions also comprises a warning given to a user of the vehicle about a possible prohibition of all of the functions when the temperature information reaches a third temperature threshold higher than the second temperature threshold.

Preferably, the first temperature threshold is of the order of 55° C. and/or the second temperature threshold is of the order of 65° C. and/or the third temperature threshold is of the order of 70° C.

According to a particular embodiment, the information delivered by the energy storage unit includes maximum elementary voltage information from the most charged elementary cell and the method also comprises the stages of comparing the maximum elementary voltage information with a first voltage threshold and of deciding on a limitation of the availability of the functions when the maximum elementary voltage information reaches the first voltage threshold for a predetermined duration. Preferably, the method also comprises the stage of interrupting the limitation of the availability of the functions when the maximum elementary voltage information falls and reaches a second voltage threshold lower than the first voltage threshold.

According to another particular feature, the information delivered by the energy storage unit includes health status information based on a difference in voltage between the most charged elementary cell and the least charged elementary cell of the energy storage unit and the method comprises the stages of comparing the said health status information with a third voltage threshold and when the health status information reaches the third voltage threshold, of informing a user of the vehicle of the need to replace the energy storage unit and/or to increase the first voltage threshold and/or the second voltage threshold and/or the predetermined duration.

From another aspect, the invention also relates to a motor vehicle micro-hybrid system comprising an energy storage unit having a plurality of supercapacitor elementary cells connected in series and delivering information on its internal status.

In accordance with the invention, the energy storage unit comprises means suitable for use of the method briefly described above.

BRIEF DESCRIPTION OF THE DRAWINGS

Other advantages and features of this invention will appear more clearly when the following is read: the description, below, of several particular embodiments with reference to the attached drawings, in which:

FIG. 3 shows the internal structure of a module for controlling the energy storage unit in FIG. 2, FIGS. 4A to 4C are curves showing various different cases of development of the voltage at the terminals of the most charged supercapacitor elementary cell and FIG. 5 shows various different modes of operation of the system in FIG. 1, introducing a limitation of the functions with temperature.

DETAILED DESCRIPTION

Figure 1:
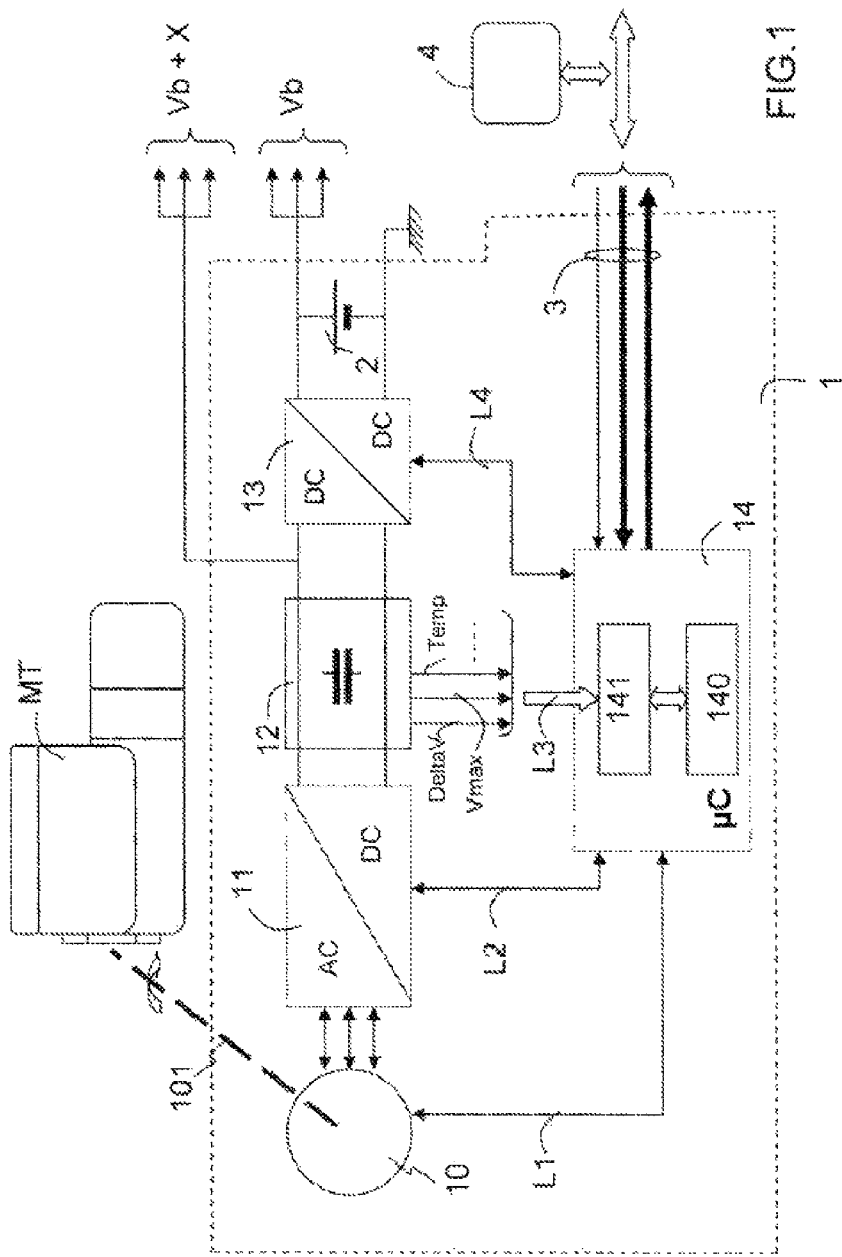
FIG. 1 is a general block diagram of a particular embodiment of a micro-hybrid system according to the invention.

With reference to FIG. 1, a particular embodiment 1 of a regenerative braking micro-hybrid system according to the invention is now described.

As shown in FIG. 1, in this particular embodiment, the micro-hybrid system 1 according to the invention essentially comprises an electrical rotating machine 10, a reversible alternating current-direct current (AC/DC) converter 11, an energy storage unit 12, a direct current-direct current (DC/DC) voltage converter 13 and a microcontroller 14.

The micro-hybrid system 1 is connected to a dual-voltage on-board supply system of the vehicle, capable of supplying a low direct current voltage Vb and a floating high direct current voltage Vb+X.

The low direct current voltage Vb is generally that of 12 V of a lead battery 2 fitted to the vehicle. Preferably, the voltage Vb can be used for supplying, in the vehicle, consuming devices requiring a relatively stable voltage value, such as the lighting and signalling devices.

In this particular embodiment, the direct current voltage Vb+X varies between 12 and 60 V for example and is available at the terminals of the energy storage unit 12, the voltage charge of which is dependent particularly on the regenerative braking operation of the electrical rotating machine 10.

The voltage Vb+X can be used in priority for supplying consuming devices which accept variable voltage such as, for example, a defrosting device. However, in certain applications, the voltage Vb+X can also be used for supplying, through a dedicated DC-DC converter (not shown), a consuming device requiring a stable direct current voltage, for example a car radio device supplied at 12 V. Furthermore, in certain applications, the voltage Vb+X is also usable for supplying, with a voltage higher than 12 V, the electrical rotating machine 10 operating in starter or motor mode.

As shown in FIG. 1, the electrical rotating machine 10 is coupled mechanically, connection 101, to a heat engine MT of the vehicle. The machine 10 is here a three-phase machine of the alternator-starter type which, apart from the modes of operation as a starter and alternator, is suitable for operating also in regenerative braking mode and in torque assistance mode. In the torque assistance mode, the machine 10 supplies additional mechanical torque for traction of the vehicle, complementing the torque supplied by the heat engine MT.

The AC/DC converter 11 is a reversible device and—when the electrical rotating machine 10 is to operate in motor/starter mode—makes possible the supply of the machine 10 with three phase alternating current voltages obtained from a direct current voltage present at the terminals of the energy storage unit 12 and—when the electrical rotating machine 10 is to operate in alternator mode—makes rectification possible in the form of a direct current voltage rectified from the three phase voltages supplied by the machine 10. This rectified direct current voltage charges the energy storage unit 12 and—through the DC-DC converter 13—the battery 2.

The energy storage unit 12 is here formed essentially from a set of supercapacitors connected in series and from appropriate electronic circuits.

The energy storage unit 12 is described in detail below with reference to FIG. 2 and comprises, in this embodiment, ten supercapacitor elements C1 to C10 connected in series.

The energy storage unit 12 makes possible, by charging itself with the direct current voltage delivered by the AC/DC converter 11, storage of electrical energy when the electrical rotating machine 10 operates in regenerative braking mode or in alternator mode. The energy stored in the energy storage unit 12 can be restored to the voltage Vb+X supply system to supply various different consuming devices and—in certain cases—to the voltage Vb supply system, through the DC/DC converter 13, for example when the machine 10 is not delivering and the battery 2 is not capable of responding to a current peak demand on the voltage Vb supply system. Furthermore, the energy stored in the energy storage unit 12, as already indicated above, can be used for starting the heat engine or for torque assistance for the latter at a voltage Vb+X which can be very substantially higher than the conventional 12 V, thus assisting the supply by the rotating machine 10 of great mechanical torque required in the case of large heat engines.

The DC/DC converter 13 is a reversible device and makes possible—on one hand—a transfer of energy to the voltage Vb supply system for supplying the consuming devices and charging the battery 2 and—on the other hand—a transfer of energy in the opposite direction starting from the voltage 12 V of the battery 2 for charging the energy storage unit 12 if necessary and supplying the AC/DC converter 11 when the rotating machine 10 is operating as a motor/starter.

The microcontroller 14 manages the operation of the micro-hybrid system 1 from information representative of the internal status of the micro-hybrid system 1 and of the status of the vehicle.

A controlling strategy module 140 is implemented in the microcontroller 14 and co-operates with a control module 141, also implemented in the microcontroller 14 and dedicated to the energy storage unit 12, so as to control the micro-hybrid system 1. Status information and commands can be exchanged between the microcontroller 14 and various different functional elements of the micro-hybrid system 1 through signal exchange connections. Signal exchange connections L1, L2, L3 and L4 between the microcontroller 14 and the elements 10, 11, 12 and 13 are shown in FIG. 1.

As also shown in FIG. 1, there is also provision for a data communication bus 3, of the analogue-digital converter type for example, for exchanges of information between the micro-hybrid system 1 and one or several electronic control units (ECUs) 4 of the vehicle. Information such as a press on the brake pedal or on the accelerator pedal can thus be transmitted to the micro-hybrid system 1 by an ECU 4 through the data communication bus 3.

Figure 2:
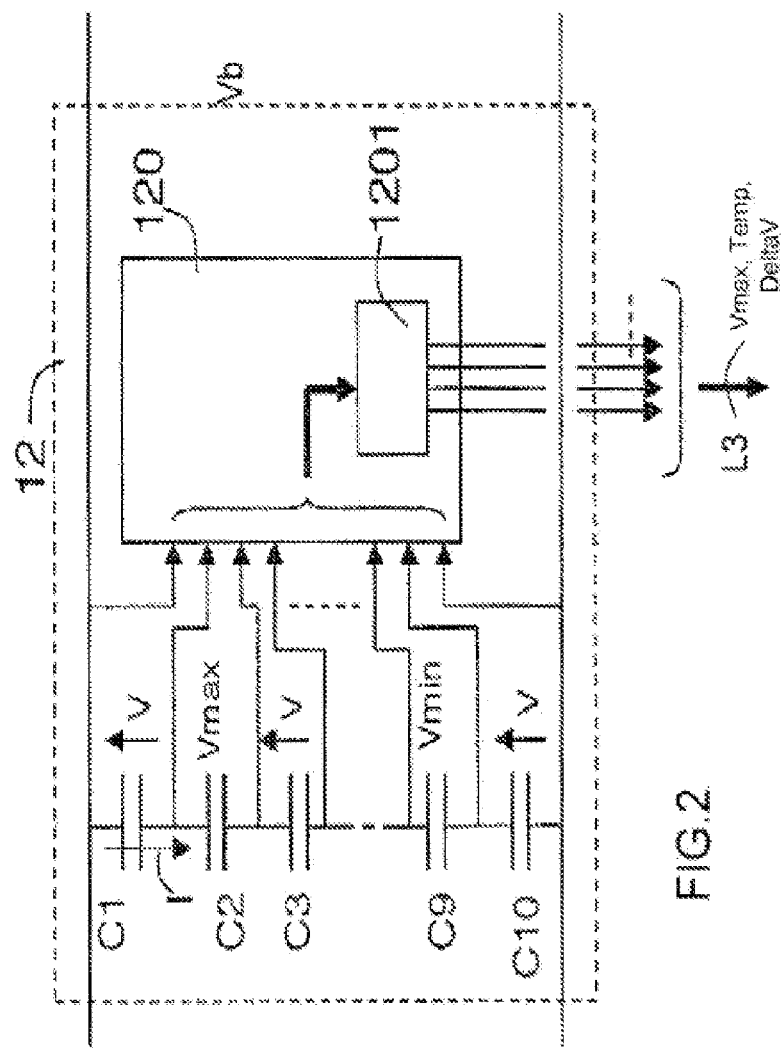
FIG. 2 shows the internal structure of an energy storage unit included in the system in FIG. 1 and formed from a plurality of supercapacitor elementary cells.

With reference more particularly to FIG. 2, there now follows a detailed description of the energy storage unit 12 and of the Vmax, Temp and DeltaV signals produced in the said unit and supplied to the control module 141 through the signal exchange connection L3 with the microcontroller 14.

As shown in FIG. 2, the energy storage unit 12 comprises essentially, in this embodiment, ten supercapacitor elements C1 to C10 connected in series as well as electronic circuits 120. These supercapacitor elements C1 to C10 form the same number of supercapacitor elementary cells connected in series and included in the unit 12.

Balancing circuits, integrated in the circuits 120, are therefore provided for so as to balance the voltages at the terminals of the supercapacitor elements and thus to prevent excesses of voltage which are likely to cause premature breakdowns or ageing of these elements. Balancing circuits for assemblies of supercapacitor elements are known to the person skilled in the art and these will not be described in this application.

The circuits 120 also comprise measurement and interface circuits 1201 suitable for producing signals of health and control of the unit 12, i.e. particularly the Vmax, Temp and DeltaV signals, which shall be described in the following paragraphs.

By means of the Vmax, Temp and DeltaV signals, it is possible for the control module 141 to manage the energy storage unit 12 in an optimum way.

The DeltaV signal carries information relating to the health status of the energy storage unit 12. For their part, the Vmax, Vmin and Temp signals carry information relating to the internal status of the energy storage unit 12 and assist the control of the latter.

The elementary voltages present at the terminals of each of the supercapacitor elements C1 to C10 are read.

By means of the Vmax signal, the control module 141 is able to know the voltage value present at the terminals of the most charged (C2 in the example of FIG. 2) of the supercapacitor elements. Knowing this Vmax value, the control module 141 can have an effect on the maximum value of the charging voltage of the unit 12 so as not to risk causing a destructive overvoltage on one of the elements of the unit 12 or causing the premature ageing of one of them or of several of them.

As will appear more clearly in the following paragraph with the description of the DeltaV signal, the Vmax signal also makes it possible for the module 141 to know precisely the value of a voltage, Vmin, at the terminals of the least charged (C9 in FIG. 2) of the supercapacitor elements, effecting the difference between the two signals Vmax and DeltaV. This Vmin information is useful, particularly during the discharge phases. In fact, during these phases, it is desirable not to cause the emergence of a negative voltage at the terminals of a supercapacitor element which was not well charged at the outset, as this could result in premature ageing of the element concerned or deterioration of the measurement electronics.

From the voltage shifts present between the supercapacitor elements and deduced from the elementary voltages read at the terminals of the supercapacitor elements C1 to C10, health status information is obtained, i.e. information representative of the fitness of the supercapacitor energy storage unit to perform its function in the micro-hybrid system. This information on the health status of the unit 12 is carried by the DeltaV signal which indicates the difference in voltage between the supercapacitor element which is the most charged and the one which is the least charged. By way of example, in FIG. 2, the element C2, at the terminals of which there is the voltage Vmax, is the most charged supercapacitor element and the element C9, at the terminals of which there is a voltage Vmin, is the least charged supercapacitor element.

Tests carried out by the inventive entity show that the more the supercapacitor elements age, the greater the differences in their electrical properties, particularly in the values of leakage current and capacitive values. At the end of the life of the energy storage unit, these differences impair the performance of the unit 12.

The DeltaV signal makes it possible for the control module 141 to be capable of informing the vehicle system as to the fact that the energy storage unit is requesting to be replaced and deciding, in the optimum way, on the manner of using the energy storage unit throughout its life, in the knowledge that the impairment of the unit's performance at the end of its life can be slow.

The Temp signal makes it possible for the module 141 to know the temperature of the energy storage unit 12 and to define an operation mode adapted to best preserving the health of the energy storage unit, which generally does not withstand excessive temperatures well (ageing or destruction).

The Vmax, Temp and DeltaV signals are produced in the energy storage unit 12 with the assistance of appropriate electronic means. The Vmax and Vmin signals can be obtained, for example, by means of a voltage comparison circuit (not shown) included in the circuits 1201. The DeltaV and Temp signals can be obtained, for example, by means of a subtracting circuit and a temperature measurement circuit (not shown) also included in the circuits 1201.

With reference more particularly to FIGS. 3, 4A to 4C and 5, there now follows a description of the control of the energy storage unit 12 from the Vmax, Temp and DeltaV signals.

As shown in FIG. 3, the control module 141 comprises a processing module 1410, a Vmax maximum voltage management module 1411, a Temp temperature management module 1412, a DeltaV voltage difference management module 1413 and a failure detection module 1414.

The function of the processing module 1410 is to define, generally, the operation mode of the micro-hybrid system 1 from among various different available modes and in particular the operation mode of the energy storage unit 12 from among various different available modes.

The operation of the Vmax management module, 1411, is now described with reference more particularly to FIGS. 4A to 4C.

As shown in FIGS. 4A to 4C, two voltage thresholds, i.e. Vmax1 and Vmax2, are defined in the module 1411. In this embodiment, these voltage thresholds have the values Vmax1=2.7 V and Vmax2=2.55 V. The threshold Vmax1=2.7 V substantially represents the maximum rated voltage of a supercapacitor elementary cell of the energy storage unit 12, this maximum rated voltage actually being slightly higher than Vmax1. The voltage threshold Vmax2 is a threshold defined for the requirements of the method according to the invention.

In the case shown in FIG. 4A, for a time from t0 to t1, the voltage Vmax increases until reaching Vmax=Vmax1 at instant t1. In accordance with the invention, a delay time T is actuated at instant t1 on the event Vmax=Vmax1. This delay time T is equal to 1 second in this embodiment. The delay time T remains active and a count of the time is carried out as long as the voltage Vmax remains higher than Vmax1. As it appears in FIG. 4A, at the end of the delay time T, bearing in mind that the voltage Vmax has not fallen below Vmax1, steps, in the form of a limitation of the availability of the functions of the micro-hybrid system 1, are taken to cause a fall in the voltage Vmax, prohibiting the operation modes of the micro-hybrid system 1 which are likely to charge the elementary cells of the unit 12 further. The voltage Vmax then falls because of the consuming devices connected to the Vb+X supply system or following an activation of discharge means (not shown) provided for in the micro-hybrid system 1. Once (instant t2') the voltage Vmax has fallen sufficiently to reach the threshold Vmax2, the limitation of the availability of the functions is cancelled and all of these are authorised again.

Still in this case of FIG. 4A, at instant t1, when Vmax=Vmax1, the module 1411 transmits information IV1, indicating to the processing module 1410 the imminence of prohibition of all the operation modes likely to charge the elementary cells of the unit 12 further. At instant t2, information IV2 is transmitted to the processing module 1410 and imperatively requests this prohibition of the modes further charging the elementary cells of the unit 12. At instant t2', information IV4 is transmitted to the processing module 1401 and indicates to the latter that all of the operation modes are authorised again.

In the case of FIG. 4B, for the time from t0 to t1, the voltage Vmax increases until reaching Vmax=Vmax1 at instant t1, as in FIG. 4A. The delay time T is actuated at t1 on the event Vmax=Vmax1. At an instant t3, when the delay time T has not elapsed, the voltage Vmax decreases and reaches the threshold Vmax1. The delay time T is then suspended but remains actuated and conserves the count made of the time t3−t1. As it appears in FIG. 4B, between the instant t3 and a subsequent instant t4, the voltage Vmax develops between the 2 thresholds Vmax1 and Vmax2 but without crossing either of these. At instant t4, the voltage Vmax again goes above the threshold Vmax1 and consecutively the count of the time of delay time T is resumed and continues until an instant t5, the voltage Vmax remaining higher than Vmax between t4 and t5. At an instant t5, the count of the time (t3−t1)+(t5−t4) reaches the duration of the delay time T the availability of the functions is limited so as to cause a fall of the voltage Vmax. As in the case of FIG. 4A, this limitation consists of prohibiting all the operation modes of the micro-hybrid system 1 likely to charge the elementary cells of the unit 12 further. The voltage Vmax then falls because of the consuming devices connected to the Vb+X supply system or following an activation of discharge means (not shown) provided for in the micro-hybrid system 1.

In a manner similar to the case of FIG. 4A, at instant t1, when Vmax=Vmax1, the module 1411 transmits the information IV1, indicating to the processing module 1410 the imminence of a prohibition of all the operation modes likely to charge the elementary cells of the unit 12 further. At instant t5, the information IV2 is transmitted to the processing module 1410 and imperatively requests this prohibition of the modes charging the elementary cells of the unit 12 further.

The example of FIG. 4B shows only one single time interval, from t3 to t4, during which the voltage Vmax remains between the two thresholds Vmax1 and Vmax2 after the actuation of the delay time T.

In accordance with the invention, there can be several time intervals such as t3 to t4 during which the count of the time is interrupted but the delay time T remains actuated and the count is resumed when the voltage Vmax becomes higher than Vmax1 again. As will appear more clearly with the following description of the case shown in FIG. 4C, a de-actuation of the delay time T, in a manner other than at the end of the latter by a count of the time equal to T, can take place only following a crossing of the voltage threshold Vmax2, the voltage Vmax becoming lower than this threshold.

In the case of FIG. 4O, for the time from t0 to t1, the voltage Vmax increases until reaching Vmax=Vmax1 at instant t1, as in FIGS. 4A and 4B. The delay time T is actuated at t1 on the event Vmax=Vmax1. At an instant t6, when the delay time T has not elapsed, the voltage Vmax decreases to below the threshold Vmax1 and then, at an instant t7, the voltage Vmax decreases to below the threshold Vmax2. At the time of the crossing of the threshold Vmax1, the delay time T is suspended but remains actuated and conserves the count made of the time t6−t1. At the time of the crossing, which ensues, of the threshold Vmax2, the delay time T is de-actuated. A subsequent count of the time, actuated on a crossing of Vmax1, as described in the foregoing paragraphs, can start only from zero.

In a manner similar to the cases of FIGS. 4A and 4B, at instant t1, when Vmax=Vmax1, the module 1411 transmits the information IV1, indicating to the processing module 1410 the imminence of a prohibition of all the operation modes likely to charge the elementary cells of the unit 12 further. Conversely, in a manner different from the cases of FIGS. 4A and 4B, at instant t7, following the de-actuation of the delay time T, information IV3 is transmitted to the processing module 1410 and indicates to the latter that the warning given by IV1 is no longer applicable.

The operation of the Temp management module 1412 is now described with reference more particularly to FIGS. 3 and 5.

In accordance with the invention, various different operation modes of the micro-hybrid system 1 are provided for, depending on the temperature of the energy storage unit 12.

In this particular embodiment, four modes are provided for, designated mode 1 to mode 4.

Mode 1 acts when the TEMP signal indicates a temperature of the unit 12 which is lower than ST1=55° C. In this mode 1, there is no limitation imposed by the unit 12 on the operation of the micro-hybrid system 1. Therefore, all the functions are authorised.

Mode 2 acts when the Temp signal indicates a temperature of the unit 12 between the threshold ST1=55° C. and a threshold ST2=65° C. In this mode 2, only the alternator and starter functions are authorised, which also makes the heat engine automatic stop-restart function available. Conversely, the regenerative braking and torque assistance functions are prohibited in the micro-hybrid system 1.

Mode 3 acts when the Temp signal indicates a temperature of the unit 12 between the threshold ST2=65° C. and a threshold ST3=70° C. In this mode 3, all the functions except the alternator mode are prohibited. The direct current voltage supplied by the machine 10 is then regulated at a value, of the order of 18 V for example, which should be sufficient to maintain a voltage Vb=14 V. The voltage Vb+X has, in this case, a fixed value, of the order of 18 V, equal to the regulated direct current voltage supplied by the machine 10. The consuming devices on the two voltage supply systems, Vb and Vb+X, thus continue to be supplied.

Mode 4 acts when the Temp signal indicates a temperature of the unit 12 higher than the threshold ST3=70° C. In this mode 4, all of the functions can be prohibited but this total prohibition can act only when all of the safety conditions have been fulfilled, i.e. when the vehicle is at rest. Furthermore, with the vehicle at rest, a discharge of the unit 12 by means of an appropriate load, a resistive load for example, can also be operated in certain applications. When not all of the safety conditions have been fulfilled for a total prohibition of the functions, the alternator function with an output of voltage regulated at a fixed value (18 V) is maintained and a warning is given to the vehicle user to inform him of an abnormal temperature of the unit 12, of an impending prohibition of all of the functions and of the need to park the vehicle as soon as possible.

Information IT1 to IT4, corresponding to modes 1 to 4 respectively, is transmitted by the Temp management module 1412 to the processing module 1410 to inform the latter of the operation mode adapted for the micro-hybrid system 1.

Regarding the DeltaV management module 1413, this compares the DeltaV signal with a voltage threshold SD, for example SD=0.2 V in this particular embodiment. If the exceeding of the threshold DeltaV>SD is maintained for at least a predetermined duration DD, it is decided that the energy storage unit 12 is out of service. The predetermined duration DD is adapted depending on the applications and can be a few minutes, several hours or even several days.

When the case arises, information ID indicating the "out of service" status of the unit 12 is transmitted to the processing module 1410 by the DeltaV management module 1413. This information ID is communicated by the processing module 1410 to a vehicle control unit which attends to informing the vehicle user of the need to replace the unit 12. Conversely, no particular limitation of the functions of the micro-hybrid system 1 is imposed. All of the functions remain authorised in order not to limit the availability of the micro-hybrid system 1.

Still regarding the DeltaV management module 1413, in certain applications of the invention, upon detection by the module 1413 of "out of service" status of the unit 12, it is possible to provide for different management of the Vmax signal, for example, with an increase of one of the voltage thresholds Vmax1 or Vmax2 or of the delay time T. These arrangements can, in certain applications, compensate for the loss of some performance in order to improve the availability of the unit 12.

Regarding the failure detection module 1414, this carries out monitoring, particularly of the management modules 1411, 1412 and 1413. When a failure of the management modules is detected by the module 1414, the micro-hybrid system 1 is operated so as to limit as much as possible the current in the energy storage unit 12 in order to prevent any deterioration of the latter. In this embodiment, the limitation carried out results in prohibition of the heat engine automatic stop-restart, regenerative braking and torque assistance functions and in alternator function with regulation at a fixed direct current voltage (18 V for example), as in the case of mode 3 for the Temp management module 1412 dealt with above.

Of course, the invention is not limited to the particular embodiments which have been described here by way of example. Different variants of execution can be carried out by a person skilled in the art, depending on the applications concerned.

The invention claimed is:

1. A method of controlling a supercapacitor energy storage unit (12) in a motor vehicle having a heat engine and a micro-hybrid system comprising an electrical rotating machine configured to operate in modes of operation including an alternator mode, a starter mode allowing an automatic stop-restart function of the vehicle heat engine, a regenerative braking mode and a torque assistance mode, said energy storage unit (12) comprising a plurality of supercapacitor elementary cells connected in series (C1 to C10) and delivering information on an internal status thereof, said method comprising the steps of:

obtaining a temperature (Temp) of said energy storage unit (12);
comparing said temperature (Temp) of said energy storage unit (12) with at least one temperature threshold; and
prohibiting at least one of said modes of operation of said electrical rotating machine when said temperature (Temp) reaches said at least one temperature threshold.

2. The method according to claim 1, wherein the step of prohibiting at least one of said modes of operation comprises the step of prohibiting at least one of said regenerative braking mode of operation and said torque assistance mode of operation function when the said temperature (Temp) reaches a first temperature threshold (ST1).

3. The method according to claim 2, wherein the step of prohibiting at least one of said modes of operation also comprises the step of prohibiting said starter mode of operation and said heat engine automatic stop-restart function when said temperature (Temp) reaches a second temperature threshold (ST2) higher than said first temperature threshold (ST1).

4. The method according to claim 3, wherein the step of prohibiting at least one of said modes of operation also comprises the step of regulating a voltage supplied by said electrical rotating machine operating in said alternator mode at a predetermined fixed value.

5. The method according to claim 3, wherein the step of prohibiting at least one of said modes of operation also comprises the step of giving a warning to a user of said motor vehicle about a possible prohibition of all of said modes of operation when said temperature (Temp) reaches a third temperature threshold (ST3) higher than said second temperature threshold (ST2).

6. The method according to claim 5, wherein said first temperature threshold (ST1) is about 55° C. and/or said second temperature threshold (ST2) is about 65° C. and/or said third temperature threshold (ST3) is about 70° C.

7. The method according to claim 1, wherein said energy storage unit (12) includes a most charged elementary cell (C2) and a least charged elementary cell (C9); and wherein said information delivered by said energy storage unit (12) includes maximum elementary voltage (Vmax) from said most charged elementary cell (C2), said method also comprises the steps of:

comparing said maximum elementary voltage (Vmax) with a first voltage threshold (Vmax1); and
interrupting at least one of said modes of operation when said maximum elementary voltage (Vmax) information reaches said first voltage threshold (Vmax1) for a predetermined duration (T).

8. The method according to claim 7, further comprising the step of interrupting at least one of said modes of operation when said maximum elementary voltage (Vmax) falls and reaches a second voltage threshold (Vmax2) lower than said first voltage threshold (Vmax1).

9. The method according to claim 7, wherein said information delivered by said energy storage unit (12) includes health status information based on a difference in voltage (DeltaV) between said most charged elementary cell (C2) and said least charged elementary cell (C9) of said energy storage unit (12), said method further comprises the steps stages of:

comparing said health status (DeltaV) information with a third voltage threshold; and when said health status (DeltaV) information reaches said third voltage threshold, informing a user of said motor vehicle of a need to at least one of replacing said energy storage unit (12) and increasing at least one of said first voltage threshold (Vmax1), said second voltage threshold (Vmax2) and said predetermined duration (T).

10. A motor vehicle micro-hybrid system in a motor vehicle having a heat engine, said micro-hybrid system comprising an electrical rotating machine configured to operate in modes of operation including an alternator mode, a starter mode, an automatic stop-restart mode of the vehicle heat engine, a regenerative braking mode and a torque assistance mode, said micro-hybrid system comprising:

an energy storage unit (12) having a plurality of supercapacitor elementary cells connected in series (C1 to C10) and delivering information on an internal status thereof, in that the said energy storage unit (12) comprising means (141) configured to:

obtain a temperature (Temp) of said energy storage unit (12);

compare the temperature (Temp) of said energy storage unit (12) with at least one temperature threshold; and prohibit at least one of said modes of operation when said temperature (Temp) information reaches said at least one temperature threshold.

11. The method according to claim 3, wherein the step of prohibiting at least one of said modes of operation comprises the step of prohibiting all of said functions when said temperature (Temp) reaches a third temperature threshold (ST3) higher than said second temperature threshold (ST2) and when said motor vehicle is at rest.

* * * * *